United States Patent
Pan et al.

(10) Patent No.: US 10,521,325 B2
(45) Date of Patent: Dec. 31, 2019

(54) MANAGING CONFIGURATION DRIFT

(71) Applicant: HEWLETT PACKARD ENTERPRISE DEVELOPMENT LP, Houston, TX (US)

(72) Inventors: Dongye Pan, Sunnyvale, CA (US); Kishan Thomas, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 753 days.

(21) Appl. No.: 15/005,917

(22) Filed: Jan. 25, 2016

(65) Prior Publication Data
US 2017/0214576 A1 Jul. 27, 2017

(51) Int. Cl.
| | |
|---|---|
| G06F 15/173 | (2006.01) |
| G06F 11/34 | (2006.01) |
| H04L 12/24 | (2006.01) |
| G06F 9/445 | (2018.01) |
| G06F 9/50 | (2006.01) |

(52) U.S. Cl.
CPC ...... *G06F 11/3495* (2013.01); *G06F 9/44505* (2013.01); *G06F 9/5005* (2013.01); *H04L 41/0816* (2013.01); *H04L 41/0843* (2013.01); *H04L 41/0873* (2013.01)

(58) Field of Classification Search
CPC ............ G06F 9/44505; G06F 11/3409; G06F 11/3058; G06F 11/00; G06F 2201/81; H04L 41/0873; H04L 41/0843; H04L 41/0816
See application file for complete search history.

(56) References Cited

U.S. PATENT DOCUMENTS

| | | | | |
|---|---|---|---|---|
| 8,909,604 | B1 * | 12/2014 | Holenstein | G06F 11/1469 707/678 |
| 8,938,489 | B2 | 1/2015 | Suit et al. | |
| 9,172,611 | B2 | 10/2015 | Guruswamy | |
| 9,189,285 | B2 | 11/2015 | Ng et al. | |
| 9,378,461 | B1 * | 6/2016 | Chatterjee | G06F 9/5005 |
| 2008/0005795 | A1 * | 1/2008 | Acharya | H04L 63/0263 726/23 |
| 2011/0225275 | A1 * | 9/2011 | Shah | G06F 9/44505 709/223 |
| 2012/0096134 | A1 | 4/2012 | Suit | |
| 2015/0234910 | A1 | 8/2015 | Schiff et al. | |

OTHER PUBLICATIONS

Turpijn, T., "Introducing PowerShell Desired State Configuration (DSC)," Building Clouds Blog, Available Online at http://blogs.technet.com/b/privatecloud/archive/2013/08/30/introducing-powershell-desired-state-configuration-dsc.aspx, Aug. 30, 2013, 4 pages.

* cited by examiner

*Primary Examiner* — Padma Mundur

(57) ABSTRACT

A system is disclosed for managing configuration drift of computing resource instances, including instructions to (1) receive a definition of a plurality of functional roles to be played by resource instances within a multi-resource computing system; (2) select, for each of the roles, a designated exemplar from the group of resource instances playing that role; (3) capture characteristics of that designated exemplar and assign the captured characteristics to a functional role template; and (4) during operation, measure configuration drift by comparing resource instances for each functional role to the functional role template associated with that role, such measuring being independent of any comparing to resource instances in the functional role.

20 Claims, 4 Drawing Sheets

MANAGING CONFIGURATION DRIFT

BACKGROUND

Computer functionality and user experience are increasingly provided via enterprise networks containing vast collections of deployed computing resources, accessible through various mechanisms, often the Internet, and that act in concert to provide services. Such systems can be referred to as "data centers" or "cloud platforms," though it will be appreciated that this discussion in general applies to multi-resource computing systems of various scales. That said, hundreds, thousands, even a hundred thousand or more hardware/software resources are often employed, including servers; databases; various software applications; firewalls; routers; bridges; switches; printing systems; network area storage devices; wireless access points; etc. Within a given category of hardware/software, there will often be different versions; resources of different vintage (e.g., legacy servers); resources near the end of their useful life; newly replaced components, etc. It will be therefore be appreciated that these systems can be incredibly dynamic.

The cloud-service-oriented IT movement has accelerated the adoption of a new set of technologies. In many cases, such systems leverage a combination of micro service, virtualization, and container technologies. While these technologies deliver flexibility, reliability, and on-demand scalability, they can also add to the already considerable dynamism referred to above. Still further, the component lineup in these environments may constantly change—any component within a service can be started, stopped, upgraded or replaced while the service is still running.

The above scenarios inevitably lead to challenges with configuration drift, which is the phenomenon where running data center infrastructure and hosted services become more and more different as time goes on, due to manual or automated ad-hoc changes and updates, and general entropy.

DETAILED DESCRIPTION

Figure 1:
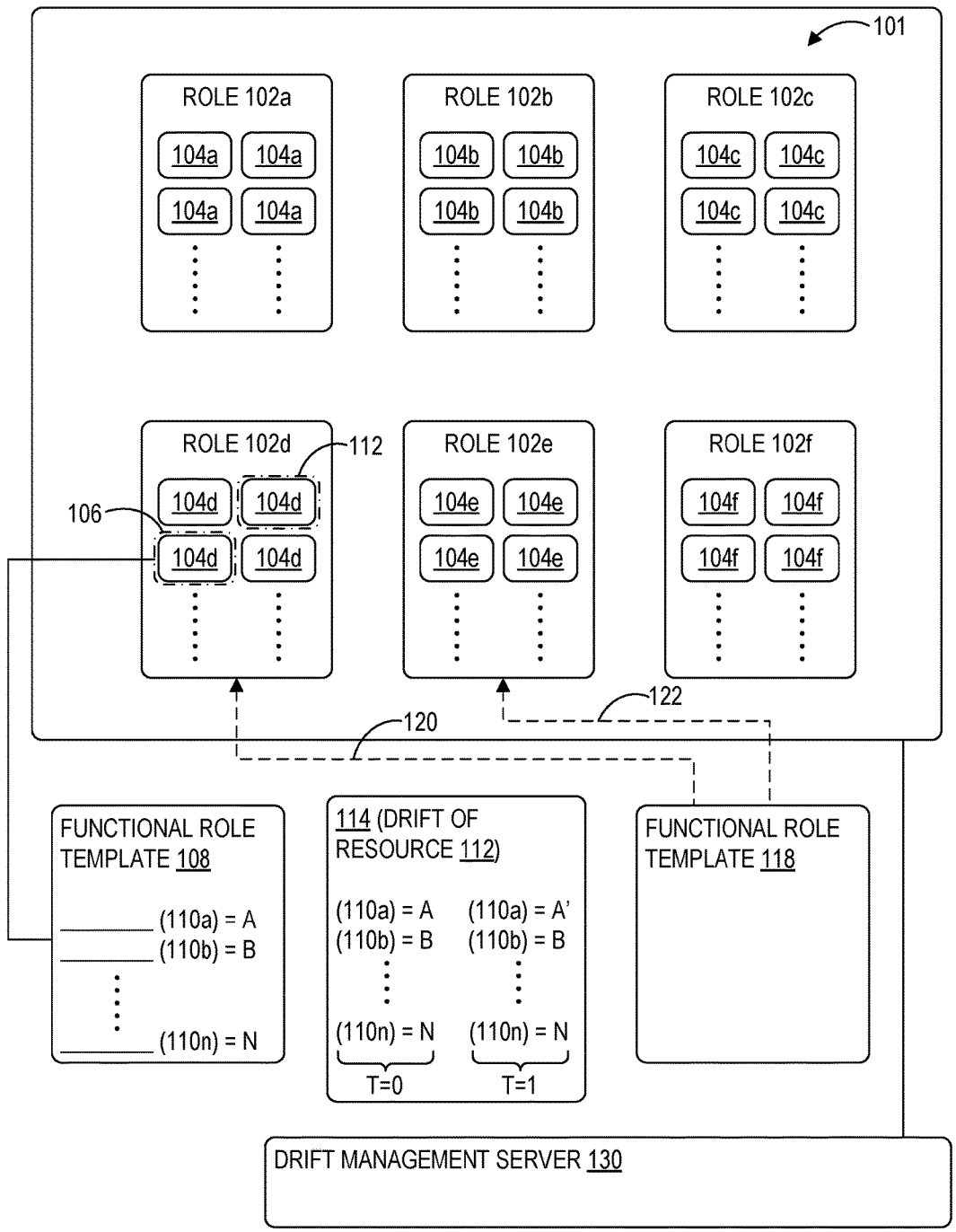
FIG. 1 depicts an example multi-resource computing system in which a plurality of computing resources are grouped into functional roles to deliver a service.

The present description contemplates any type of user experience or other service that can be delivered via a collection of computing resources. Examples include social media platforms; database platforms; web browsing services; online backup services; auction and electronic payment services; online banking; marketing services; tourism and travel; entertainment delivery platforms; music and video streaming; etc. Each of the above examples may be broken down in terms of multiple functional roles that cooperate to deliver the service.

Typically, each functional role is carried out via operation of similarly-enabled computing resources, such as servers, storage devices and the like. A functional role may, however, be carried out by resources of different types or configurations, e.g., web servers cooperating with database servers to provide functionality in the same role. Typically, each type of computing resources is initially configured in a manner that is preferred/optimized for carrying out the functional role. However, as indicated above, some computing resources will inevitably depart during operation from how they are initially configured. This "configuration drift" is particularly challenging in large and dynamic systems where micro services and other technologies are employed to enhance scalability, and high-entropy environments where computing resources are regularly started, stopped, replaced, added, etc., on-the-fly during operation of the system. The configuration drift in many cases can be difficult to diagnose and locate, and can adversely affect the service that is ultimately being delivered.

An example approach to addressing configuration drift is to measure, for a specific computing resource, how it has changed over time, relative to itself or another computing resource in the same functional role. In other words, to assess the configuration drift of a computing resource, it is compared against itself or other actual computing resources.

Another example approach entails comparison computing resources to functional roles instead of to specific computing resources that deliver a service. From a group of computing resources playing a given functional role, one of the computing resources may be selected—the "designated exemplar"—and certain characteristics of that resource may be captured/measured (e.g., the value of a particular property). With respect to "playing" a functional role, that typically means that the computing resourcing is performing specific functions that support the role. For example, in the case of a database role, a computing resource might permit writing and reading of database records, implement locking behavior to prevent data corruption and contention, limit the number of users accessing portions of the database, and the like. In another "playing a role" example, a resource playing a web server role might receive requests (e.g., HTTP requests) and respond to such requests by returning requested content. In a more specific example of such a role, the server might be in a "healthcare patient records portal" role in which it receives and responds to requests, from medical patients, to requests for records pertaining to their health care.

In any case, referring again to designated exemplars, the measured characteristics of the designated exemplar referred to above can define and be assigned to what is referred to herein as a functional role template. Changes (configuration drift) are then measured against that template. Remediation, generation of further functional role templates, and/or other actions may be carried out in response to measuring configuration drift using the template.

Again, for purposes of drift detection/measurement, the computing resources in a functional role grouping are compared to the functional role template, and not to a particular computing resource. In many examples, this increases the ability to diagnose and respond to configuration drift. Also, the functional role template is unaffected by system dynamics that would affect a system where computing resources are compared to a specific machine. Specifically, since the functional role template, once created, is decoupled from any particular machine, it can provide an accurate and efficient assessment of configuration drift regardless of what happens to the underlying designated exemplar that was used to create it (or any other resource instance that would aid in drift assessment absent availability of the described functional role template). The decoupled character of the functional role template also enables potential use of the template or related templates in other functional groups; use of the template to monitor drift and potentially other behavior in other functional groups; among other potential uses. And all of these scenarios are possible even when benchmark resource instances are no longer present—e.g., the original resource used as a designated exemplar for the functional role template.

Referring now to FIG. 1, the figure depicts a computing system 101 that may execute or provide a service. As mentioned above, any type of service is contemplated—a web browsing service; online banking; social media, etc. The service is executed via a multi-resource computing system 101 that includes computing resources playing multiple different functional roles 102a-f, for example data storage, user authentication, database access, payment security, etc. For each functional role 102, a number of computing resources 104 are deployed (resources 104a for functional role 102a; resources 104b for role 102b, etc.). For example, in a large enterprise, thousands of servers ("computing resources") could be engaged in serving up content (one "functional role") associated with potential retail purchases. It will be appreciated from the above that "functional role" can encompass or include any action, task, behavior, activity, course of conduct, etc. that can be performed by a computing resource or resources. Referring to computing resources, they at times will be referred to herein as resource instances, to emphasize the distinction between specific devices and abstract representations that describe how those devices are to function.

From the above, it will be appreciated that the system parameters are often defined such that a given computing resource plays a single functional role. However, system definitions are possible in which a single computing resource plays multiple different functional roles. Configurations are also possible where a functional role spans multiple different computing resources.

In the present example shown in FIG. 1, there are six functional roles 102a-f, each being carried out by associated resource instances 104a-f. It will be understood however, that more or less functional roles may be involved. In large enterprise systems, there may be hundreds or more functional roles, thereby greatly exacerbating configuration drift and its challenges.

As further described below, the present systems and methods contemplate, for some or all of the functional roles, the selection of a designated exemplar from the computing resource instances associated with that functional role. One such exemplar is indicated at 106 in FIG. 1. To provide a baseline for configuration drift calculation, the designated exemplar 106 is assumed to be in, or is placed into, a desired state (e.g., via an explicit, automated or other setup process) and then one or more characteristics of the exemplar are captured (e.g., measured, assessed, recorded, etc.). The captured characteristics are then assigned to a functional role template. An example functional role template 108 is shown in the figure, along with the constituent characteristics 110a through 110n (any number of characteristics may be captured) that substantively define the template. Such characteristics might include, for example and for a server, access time; permitted open ports; file structure parameters; target utilization; etc.

The system of FIG. 1 may include a drift management server or servers to implement drift management. An example draft management server 130 is depicted in FIG. 1. Drift management server 130 may carry out some or all of the functionality described above. In particular drift management server 130 may (1) define functional roles; (2) identify resource instances playing functional roles; (3) select designated exemplars; (4) capture characteristics of designated exemplars; (5) assign captured characteristics to functional role templates; and (6) measure drift by comparing resource instances to functional role templates. In addition to or instead of drift management server 130 performing these operations, the operations may be performed by one of the computing resources 104 or multiple of the computing resources 104. Still further, drift management may be shared by the drift management server 130 and computing resources 104. For example, a computing resource 104 may be responsible for comparing itself or another computing resource to a functional role template 108, with the drift management server 130 carrying out other of the above functions.

The functional role template 108 defines aspects of the desired state of the resource instances that deliver the functionality of the associated functional role. For example, an SQL database should have specific ports open; its usage should be within certain levels during execution of particular functions; it should maintain a particular file structure in a portion of its operating system files; etc. As the overall system goes forward in operation, with each group dynamically performing its functional role, configuration drift may occur. The configuration drift can be via manual ad-hoc changes (e.g., via operation of a system administrator), automatic, or through other circumstances or general entropy. The functional role template 108 provides a mechanism for detection and evaluation of drift, and for triggering decisions about responsive action (further assessment; consideration of positive effects; remediation; re-defining the functional role template; etc.).

In the example of FIG. 1, the captured values of the characteristics are characteristic $110a$=A; characteristic $110b$=B; ... characteristic $110n$=N. As previously indicated, the captured values that are assigned to the functional role template 108 are used in assessing configuration drift of resource instances in the functional role (i.e., functional role 102d). One such resource instance is computing resource 112, whose drift is shown at 114. As shown in the figure, at time T=0 the resource instance 112 is in line with (e.g., match) the values captured from the designated exemplar 106 (no drift has occurred). However, at a later time T=1 (perhaps several days later), characteristic 110a has drifted from a value A to A'. As previously indicated, identification/measurement of A>A' drift is made not with respect to any other particular resource instance, but rather is made via a comparison to the characteristics specified in functional role template 108. As described above, making drift assessments in this way—i.e., comparing against the functional role template and not against any particular resource instance—facilitates drift identification and measurement, particularly in large dynamic environments where resources stop, start and are replaced frequently. Again, the configuration drift measurements described herein are made via comparison to functional role templates, independent of any comparison of a computing resource to other, actual computing resources in the functional role.

Figure 2:
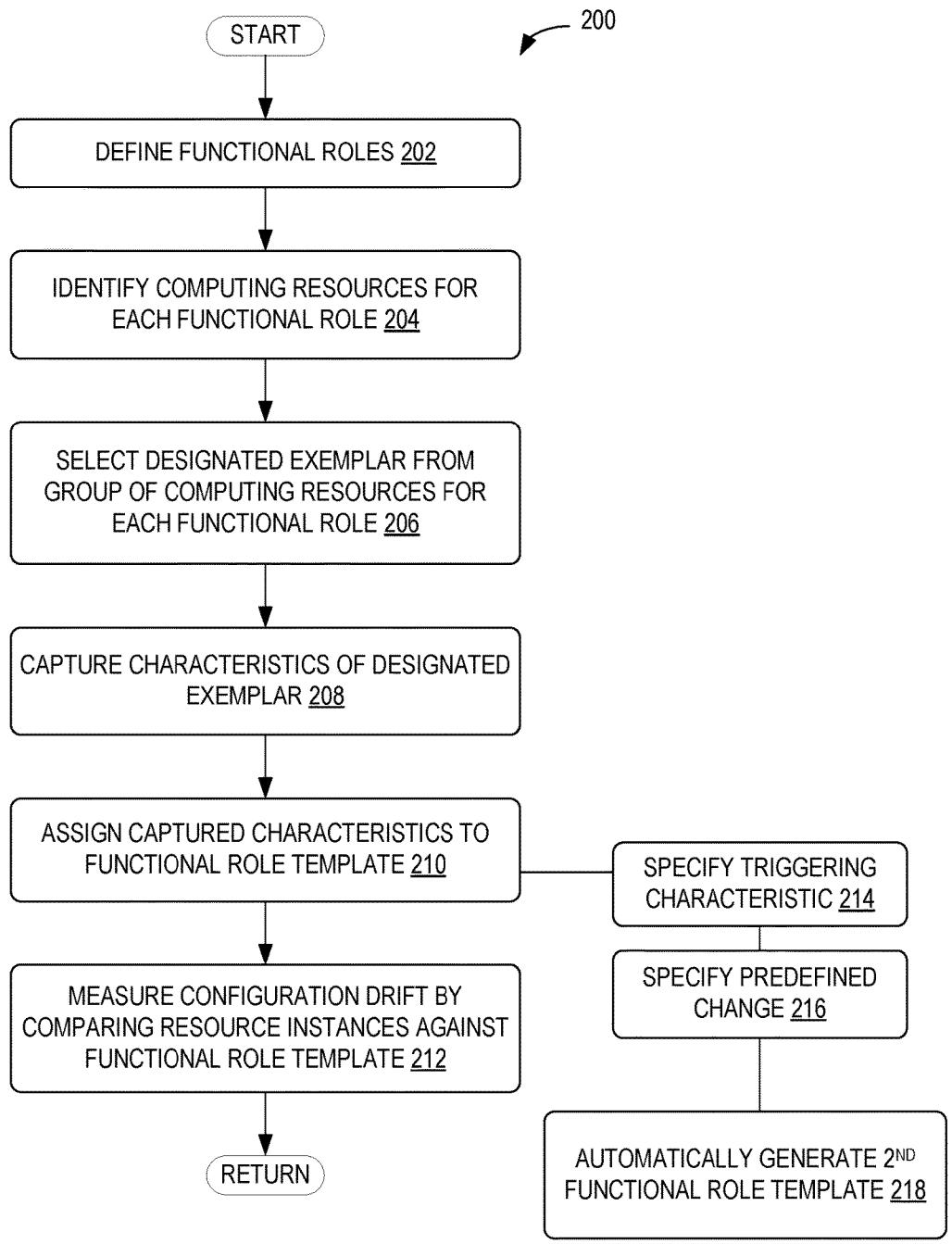
FIG. 2 depicts an example method of managing configuration drift of computing resources in functional roles, e.g., the computing resources in the functional roles of FIG. 1.

Referring now to FIGS. 1 and 2, a specific example of a health insurance platform will be described (e.g., corresponding to service 100). Example functional roles in this platform include: (a) front-end web access—e.g., corresponding to functional role 102a of FIG. 1; (b) confidential health records database access—functional role 102b; (c) a database of health care providers associated with the health insurance platform—functional role 102c; (d) confidential billing portal for health care providers—functional role 102*d*; (e) secure payment portal—functional role 102*e*; and (f) back-end database support—functional role 102*f*.

As described above, it often will be the case that an individual resource instance carries out a functional role. In other examples, two or more resource instances cooperate as an operational unit to carry out a functional role, with this multi-resource arrangement being even extendable to different types of resources—e.g., a server or servers paired with a storage area network to play a defined database functional role. In this case, as described in more detail below, the servers together with the storage area network would collectively be compared to an appropriate functional role template to assess drift of the aggregate behavior of those two computing resource types. In another example, one resource plays two or more separate functional roles, such as a server that handles both login authentication and a payment role.

The management of configuration drift may include, as a step, defining a plurality of different functional roles to be played by computing resources within the system. This is indicated in method 200 at 202. For example, in the above healthcare context, this might include identifying the front-end web access role 102*a*, database record handling role 102*b*, etc. Continuing with method 200, it may further include, as shown at 204, identifying, for each of the plurality of different functional roles, a group of computing resources that are to be deployed to carry out the functional role in providing the service. In the example, this might include identifying confidential bill portals for role 102*d*, servers that are to house and provide access to confidential patient records for role 102*b*, etc.

Continuing with method 200, as shown at 206, a designated exemplar may be selected from the group of resource instances in each functional role (e.g., designated exemplar 106 of FIG. 1). For example, in a group of different database servers servicing patient records (functional role 102*b*), one of the servers may be selected as a designated exemplar to provide the blueprint (functional role template) for measuring configuration drift. At 208, a plurality of configuration characteristics of the designated exemplar are captured. Any number and type of characteristics may be captured. The captured/measured characteristics are then assigned, as shown at 210, to a functional role template for the functional role (e.g., functional role template 108 of FIG. 1). Subsequently, as shown at 212, during provision of the service, configuration drift is measured by comparing resource instances of the functional role in each group against the functional role template for that group (e.g., drift measurement 114 in FIG. 1). Typically, the measurement is made without reference to comparisons with any other resource instance in that group.

In some cases, it may be desirable to treat certain characteristics in the functional role template differently than others. For some characteristics, it may be sufficient that they be periodically monitored without urgency, e.g., every few days or weeks, and without necessarily requiring rapid system changes in response to detected configuration drift. In other examples, it may be desirable to quickly and/or automatically respond to changes caused by configuration drift. In one example, a characteristic associated with security may drift. In another example, a characteristic having a significant bandwidth effect may immediately affect customer experience/satisfaction.

Accordingly, method 200 contemplates the ability to allow for automatic adjustment of functional role templates when certain characteristics drift. Referring to 214, creating the functional role template may include specifying a triggering characteristic within the functional role template. This characteristic can be any of the examples described herein or any other suitable characteristic. Multiple characteristics may also be specified as triggering characteristics. Then, at 216, a predefined change in that characteristic is specified, e.g., via the management server 130 of FIG. 1. The predefined change may be a particular change or drift in a value of the triggering characteristic that would cause generation of a new template or incur another response. Then, in response to use of the functional role template to conduct drift measurement (e.g., at 212), a second functional role template is automatically generated at 218 when the specified predefined change in the triggering characteristic occurs. The generation of the new template (e.g., the second functional role template) may proceed as previously indicated via capture of characteristics and assignment to the new template.

In one triggering example, a database file structure (or aspects thereof) might be specified as the triggering characteristic. Then, to guard against data corruption, the predefined change might be a change indicative of file corruption. In the event of trigger detection, the automatically-generated new functional role template might then include a specification that database systems within the functional role point toward a different non-corrupted resource. In another triggering example, a bandwidth-associated condition in the functional role template might be specified as the predefined change. When the triggering condition is measured via the functional role template monitoring, a response make the form of an adjustment made in resource instances of the functional role group in order to ensure necessary bandwidth is maintained (e.g., for an important customer-facing function).

It will be appreciated that method 200 is provided by way of example and is not meant to be limiting. Therefore, it is to be understood that method 200 may include additional and/or other steps than those illustrated in FIG. 2. Further, it is to be understood that method 200 may be performed in any suitable order. Further still, it is to be understood that at least one step may be omitted from method 200 without departing from the scope of this disclosure.

Figure 3:
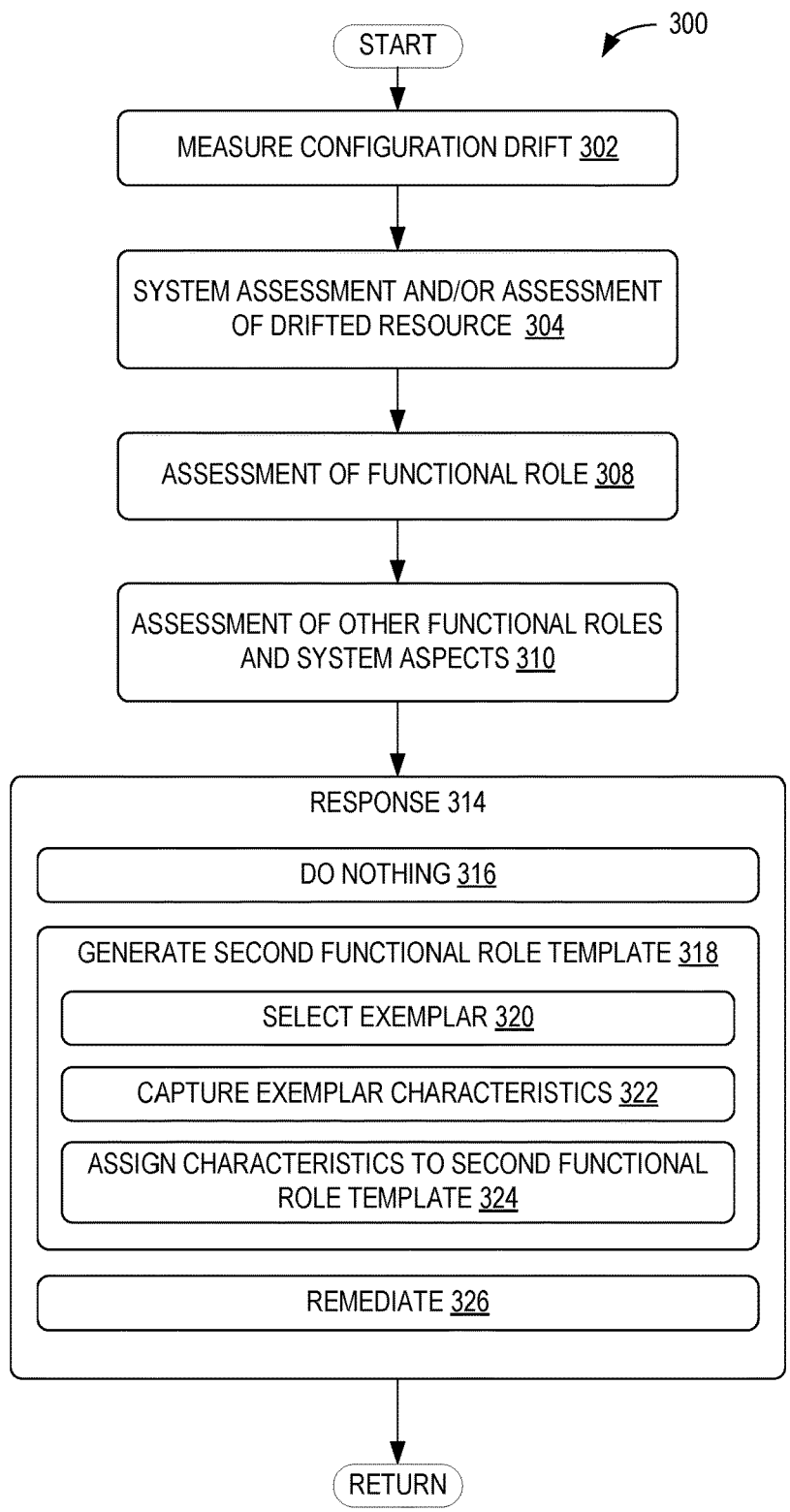
FIG. 3 depicts an example method of responding to configuration drift.

A variety of actions may be taken in response to measuring (i.e., detecting and/or detecting and quantifying) configuration drift. Referring to FIG. 3, method 300 is directed to responding to measured configuration drift. At 302 the method includes measuring configuration drift. As previously indicated, this typically is performed by comparing the behavior of resource instances against the associated functional role template for the functional role of that resource instance, independent of any comparison to specific resource instances.

In some examples, the drift measurement at 302 is made with respect to a resource instance, or multiple resource instances, automatically as the drift is observed, as opposed to measurement being made on a schedule or at some defined time. Measured drift may then be reported or otherwise acted upon as described in more detail below. For example, some type of automated response may be triggered by a characteristics in the functional role template exceeding a threshold. In other examples, drift measurement may happen on a schedule or in a more systematic way, for example, measuring multiple resources at a particular time. For example, at a specified time, all of the current resource instances in a functional role grouping may be identified, with each resource then being assessed for configuration drift using the functional role template. Measured drift may then be reported and/or otherwise acted upon.

It will be appreciated that configuration drift in many of the examples herein is defined and measured with reference to the measured/specified characteristics in the functional role template (e.g., characteristics 110a-110n of FIG. 1). In other words, the configuration of a resource instance over time may vary considerably without such change being identified as configuration drift, if the changing characteristics are not part of the functional role template. On the other hand, a small change in a single parameter may qualify as configuration drift if the changed parameter is called out in the functional role template.

Once configuration drift is measured, an assessment of aspects of the overall system and/or of the drifted resource may be made, as shown at 304. In many examples, measured drift is followed by generation of additional functional role templates. For example, FIG. 1 shows a second functional role template 118. In some examples, as shown at 120, the second functional role template 118 is used to measure further configuration drift in the functional role associated with the first functional role template (e.g., the functional role template 108), either as an update/replacement, or in conjunction with the first functional role template. In other examples, as shown at 122, the second functional role template 118 is used in connection with a different functional role (e.g., role 102e). Deployment in a different functional role may even be made using a designated exemplar from the first functional role (e.g., a designated exemplar from role 102d is used to generate a template for role 102e). For example, an assessment made in response to measured configuration drift in one functional role may inform that a potentially desirable configuration can be used in a different role. Still further, in generating a second functional role template, the designated exemplar may be the same resource instance used for the first functional role template or a different resource instance.

In some cases, generation of additional functional role templates may be at least partially manual. For example, a drifted resource may be analyzed in a specific manual assessment. This assessment may inform a specific reconfiguration of that machine (or another), with characteristics of that reconfiguration then being used via use of that machine as a designated exemplar. In other cases, response to configuration drift may automatically trigger generation of a new designated exemplar and/or new functional role template. Remediation (returning a resource instance to the state specified in the functional role template) may also be automatic or manual.

Returning to FIG. 3, and specifically to step 304, it will often be desirable to make an assessment of the drifted resource itself. Assessments often will focus on the functional role template—e.g., which template characteristics have drifted, and to what degree. If, for example, one template characteristic is a target CPU utilization during a specified process, assessment may be made of the actual utilization that occurred. If utilization was lower, updating of the functional role template might include responding to such surplus by increasing a target utilization allocation for a different process.

In another example, a drifted server might have operating system files that have strayed from that specified in the functional role template, with a likely response being remediation to restore the resource instance to the original structure. It will also be appreciated that assessments may be made other than relating to the characteristics of the functional role template, e.g., general performance; throughput when connecting to other resources; power consumption; temperature; benchmarking against other resource instances in the functional role; etc.

As shown at 308, drift detection typically will also be followed by an assessment of the functional role, i.e., whether and to what extent it is being carried out in a satisfactory manner. For example, if the functional role in a healthcare setting is securely handling patient logins to a portal, assessments might be made about password activity; whether security measures are being fully adhered to; response times for the patients; whether file structure integrity is being maintained on servers; whether open port restrictions are being observed; response times for password reset operations; etc. One very specific example of assessment and remediation might be, in response to a generalized observation that faster customer response times are needed, update the functional role template so that more processing resources are allocated to the functional role itself, as opposed to allowing the resource instances to spend computing resources on other activities. Still further assessments may be made, as shown at 310. Specifically, assessment of what is happening in other functional roles may be made, as well as various assessments of the overall service platform, since drifted resources at any place in the system may have effects other than just within their functional roles.

Regardless of the particulars of detection and assessment, method 300 may further include a response 314, which may take various forms. One response, shown at 316, may be to do nothing. Regardless of whether performance in the functional role or elsewhere has changed for the better or worse (or no change), assessment may reveal that changes in the drifted resource are unrelated, and updating the functional role template is not otherwise desired.

In other cases, it will be desirable to generate a second functional role template for the functional role, as shown at 318. The particulars of the update are shown at 320, 322 and 324, and are similar to that described above: (1) selection of a designated exemplar—320; (2) capture characteristics of the designated exemplar—322; and (3) assigning the measured characteristics to the second functional role template—324.

As shown at 326, response to detected configuration drift may also include remediation, or returning the drifted resource to the state specified by the operative functional role template. Such remediation may be manual, e.g., by a system administer conducting maintenance, upgrades, etc. In other cases, drift may trigger a machine to automatically re-align with the characteristics specified in the functional role template. Such triggering might occur automatically in response to a detected change in the characteristics of the functional role template. For example, if the functional role template were to specify something about open ports during a specific operation, and a functional role template analysis revealed a violation, then the device, of its own accord, could rectify its operation to be in accordance with the definition of the functional role template.

It will be appreciated that method 300 is provided by way of example and is not meant to be limiting. Therefore, it is to be understood that method 300 may include additional and/or other steps than those illustrated in FIG. 3. Further, it is to be understood that method 300 may be performed in any suitable order. Further still, it is to be understood that at least one step may be omitted from method 300 without departing from the scope of this disclosure.

Updating of the functional role template will often be in response to an observed positive change, whether in the drifted resource itself, or elsewhere and attributable to the configuration drift. Updating may nonetheless be desirable for other reasons. For example, in the case of a certain file structure being part of the defined functional role template, that structure in a resource instance may drift over time into a configuration that is more efficient or easier to install/maintain from an administrative standpoint. Thus, despite having no direct positive impact on system performance, it may be desirable to update the functional role template to reflect the drifted structure. In another example, a drifted configuration may reveal that system objectives can be achieved with less expensive equipment, thus informing future hardware deployment and definition of functional role templates.

As indicated above, it will be appreciated that any resource instance in a functional group may serve as the designated exemplar for the update. In some cases, it will be the resource instance that served as the designated exemplar for the functional role template being updated. In other examples, a different resource instance may be used.

As with the initial functional role template, any practicable number and type of characteristics may be employed in the updated template. Assuming five measured characteristics (ABCDE) in the functional role template being updated, with characteristic A being the one that has drifted, an updated functional role template may be constructed so that only the A characteristic varies from the definitions of the original functional role template. In other examples, a new template may be generated with changes to B, C, D and/or E. Still, further, the new template may omit some of the initial characteristics or add new characteristics to the template. A nearly limitless number of modifications may be made in generating the new template.

In the above examples, drift is observed in a resource instance within a functional role with template updating, if any, occurring within that same functional role. In other examples, an observed configuration drift in one functional role may provide insight into how configuration drift can be managed within another functional role. For example, assume functional roles A and B. Both functional roles entail the use of Apache web servers, but are used to deliver different aspects of a customer experience (e.g., delivery of service 100). Functional role A might be serving web pages in a low-security part of a platform, while functional role B might handle payments in a high-security part of the platform. Though these server groupings play different roles, there might be some overlap in specific functionalities, such as threshold user authentication. Then, assume a configuration drift in at least one resource instances of functional role A, with the drift having the effect of decreasing response time in the threshold authentication. For functional role A, this could result in a re-definition of the associated functional role template. Then, since the resource instances of functional role B are also performing that same authentication step, the new functional role template of functional role A, or parts thereof, can be ported over for use in functional role B.

The above example illustrates a further option that may be employed in connection with the systems and methods herein. Specifically, for any given resource instance, multiple functional role templates may be employed. For example, for a server, a functional role template may govern or be associated with its file structure, while another applies to a database application running on the server, with still another applying to the various ports that are open during operation and processing. Still further, a given resource instance may be partitioned such that part of the resource is defined as belonging to a first functional role. These are but non-limiting examples of mapping between resource instances and the functional role templates used to assess drift in those resources.

In some examples, it will be desirable to consider configuration drift in the context of multiple different computing resources. Load balancing in particular provides a useful example. Pre-deployment testing under specified conditions may show adequate performance when groupings of database servers have a certain number of ports open collectively—i.e., a collective configuration characteristic. In another example, there may be a target utilization goal for server clusters in a functional role. In still another example, the configuration drift aspect of interest may be a file structure that is maintained across multiple different servers (e.g., Apache servers running a particular application). These characteristics can be captured at deployment via a multiple-instance grouping as a designated exemplar. In such a case, selecting a designated exemplar includes selecting multiple resource instances from those in the functional role computing resource grouping. The multiple-instance grouping serves as the designated exemplar. Characteristics are then captured from the exemplar and assigned to a functional role template. Multiple-instance resource groupings in the functional role are then monitored during operation for drift using the multiple-instance functional role template. Specifically, in the above examples, collective open ports would be monitored for groupings of database servers.

The groupings in the above examples may be pre-assigned, such that designated groupings (e.g., predefined n-member banks of servers) are employed. In other examples, the groupings may be dynamic such that configuration drift assessment can employ the functional role template to look at ad-hoc groupings of resource instances.

Figure 4:
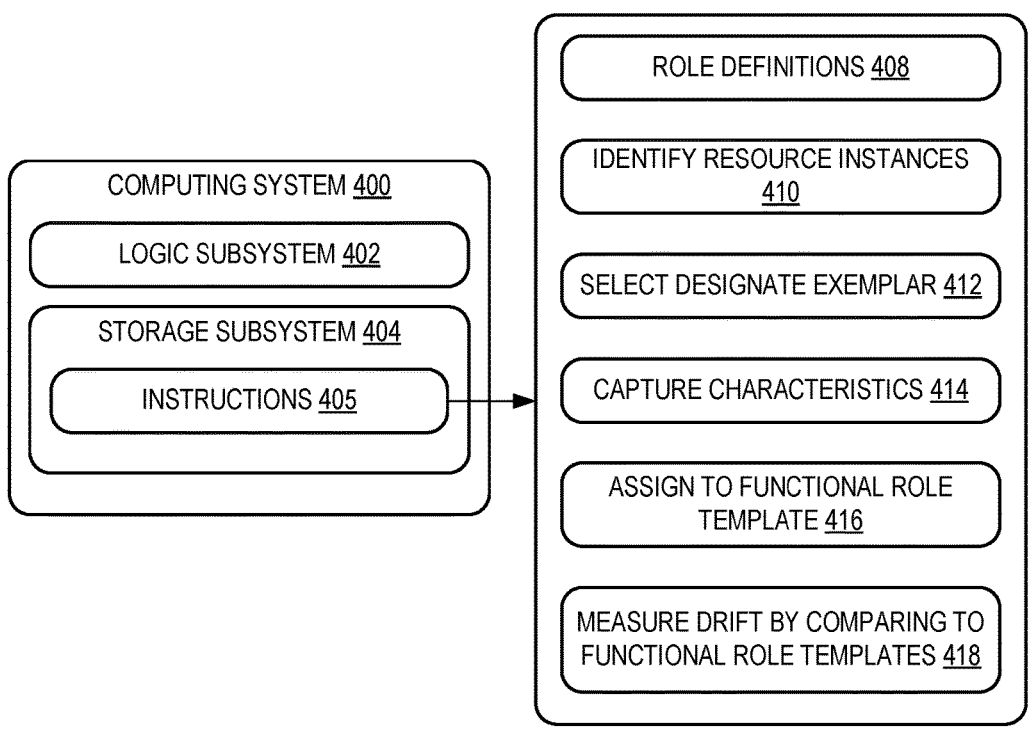
FIG. 4 depicts an example computing system, aspects of which may be incorporated into the system of FIG. 1 and used to carry out the methods of FIGS. 2 and 3.

FIG. 4 schematically shows a non-limiting example of a computing system 400 that can enact the methods and processes described above. Computing system 400 is shown in simplified form. Computing system 400 may take the form of personal computers, server computers, tablet computers, home-entertainment computers, network computing devices, gaming devices, mobile computing devices, mobile communication devices (e.g., smart phone), wearable devices, and/or other computing devices.

Computing system 400 includes a logic subsystem 402 and a storage subsystem 404. Computing system 400 may include a display subsystem, input subsystem, communication subsystem, and/or other components not shown in FIG. 4.

Storage subsystem 404 contains instructions 405 that are variously executable to carry out some of the example systems and methods above. For example, with reference both to FIG. 4 and to various features and steps of FIGS. 1-3, the instructions 405 may be executable to (a) receive a definition of a plurality of functional roles to be played by computing resources within a multi-resource computing system (408 in FIG. 4); (b) receive, for each of the functional roles, an identification of a group of computing resources, each referred to as a resource instance, for carrying out the functional role (410); (c) select, for each of the functional roles, a designated exemplar from the group of resource instances (412); (d) capture a plurality of characteristics of the designated exemplar (414); (e) assign the captured characteristics to a functional role template associated with the functional role (416); and (f) during operation of the multi-resource computing system, measure configuration drift by comparing resource instances for each functional role to the functional role template associated with that role (418). The instructions may be further executable to carry out the various other features and acts described in connection with FIGS. 1-3.

Logic subsystem 402 includes at least one physical device to execute instructions. For example, the logic subsystem 402 may be adapted to execute instructions that are part of at least one application, service, program, routine, library, object, component, data structure, or other logical construct. Such instructions may be implemented to perform a task, implement a data type, transform the state of components, achieve a technical effect, or otherwise arrive at a desired result.

The logic subsystem 402 may include a processor(s) to execute machine-readable instructions. Additionally or alternatively, the logic subsystem 402 may include hardware or firmware logic subsystems to execute instructions. Processors of the logic subsystem 402 may be single-core or multi-core, and the instructions executed thereon may carry out sequential, parallel, and/or distributed processing. Individual components of the logic subsystem 402 may be distributed among separate devices, which may be remotely located and/or arranged for coordinated processing. Aspects of the logic subsystem 402 may be virtualized and executed by remotely accessible, networked computing devices in a cloud-computing configuration.

Storage subsystem 404 includes one or more physical devices to hold instructions executable by the logic subsystem 402 to implement the methods and processes described herein. When such methods and processes are implemented, the state of storage subsystem 404 may be transformed— e.g., to hold different data.

Storage subsystem 404 may include removable and/or built-in devices. Storage subsystem 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 may include volatile, nonvolatile, dynamic, static, read/write, read-only, random-access, sequential-access, location-addressable, file-addressable, and/or content-addressable devices.

Aspects of logic subsystem 402 and storage subsystem 404 may be integrated together into hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic subsystem 402 executing instructions held by storage subsystem 404. It will be understood that different modules, programs, and/or engines may be instantiated from the same application, service, code block, object, library, routine, API (application program interface), function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

A "service", as used herein, is an application program executable across multiple user sessions. A service may be available to system components, programs, and/or other services. In some implementations, a service may run on server-computing devices.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of managing configuration drift in a multi-resource computing system, comprising:
    defining a plurality of functional roles to be played by resource instances within the multi-resource computing system;
    identifying, for a first functional role of the plurality of functional roles, a group of resource instances for carrying out the first functional role;
    for the first functional role, selecting a designated exemplar from the group of resource instances;
    capturing a first plurality of characteristics of the designated exemplar;
    assigning the captured first plurality of characteristics to a first functional role template for the first functional role;
    specifying a first characteristic of the first functional role template as a triggering characteristic;
    specifying a predefined change amount for the triggering characteristic;
    during operation of the multi-resource computing system, measuring configuration drift by comparing resource instances for the first functional role to the first functional role template;
    in response to a detection of the predefined change amount for the triggering characteristic:
        selecting a second designated exemplar from the group of resource instances;
        capturing a second plurality of characteristics of the second designated exemplar; and
        automatically generating a second functional role template for the first functional role using the second plurality of characteristics.

2. The method of claim 1, where the predefined change amount for the triggering characteristic is associated with an improved efficiency for the first functional role.

3. The method of claim 1, further comprising using the second functional role template to measure configuration drift in resource instances associated with the first functional role.

4. The method of claim 1, where the predefined change amount for the triggering characteristic is associated with a reduced equipment expense for the first functional role.

5. The method of claim 1, where the predefined change amount for the triggering characteristic is associated with an improved maintenance for the first functional role.

6. The method of claim 1, where the predefined change amount for the triggering characteristic is associated with an improved installation for the first functional role.

7. The method of claim 1, where the predefined change amount for the triggering characteristic is indicative of file corruption in a database file structure.

8. The method of claim 1, where the measuring is performed at different time intervals for different characteristics in the first plurality of characteristics of the first functional role template.

9. The method of claim 1, where selecting the designated exemplar includes selecting multiple resource instances from the group of resource instances so that a multiple-instance grouping serves as the designated exemplar.

10. A system for managing configuration drift, comprising:
a processor;
a storage device containing instructions executable by the processor to:
receive a definition of functional roles to be played by resource instances within a multi-resource computing system;
receive, for a first functional role of the functional roles, an identification of a group of resource instances for carrying out the first functional role;
select, for the first functional role of the functional roles, a designated exemplar from the group of resource instances;
capture a first plurality of characteristics of the designated exemplar;
assign the captured first plurality of characteristics to a first functional role template for the first functional role;
specify a first characteristic of the first functional role template as a triggering characteristic;
specify a predefined change amount for the triggering characteristic;
during operation of the multi-resource computing system, measure configuration drift by comparing resource instances for the first functional role to the first functional role template; and
in response to a detection of the predefined change amount in the triggering characteristic:
select a second designated exemplar;
capture a second plurality of characteristics of the second designated exemplar; and
automatically generate a second functional role template for the first functional role using the second plurality of characteristics.

11. The system of claim 10, where the predefined change amount for the triggering characteristic is associated with an improved efficiency for the first functional role.

12. The system of claim 10, where the predefined change amount for the triggering characteristic is associated with a reduced equipment expense for the first functional role.

13. The system of claim 10, where the predefined change amount for the triggering characteristic is indicative of file corruption in a database file structure.

14. The system of claim 10, where to select the designated exemplar, the instructions are executable to select multiple resource instances from the group of resource instances so that a multiple-instance grouping serves as the designated exemplar.

15. A non-transitory machine-readable storage medium storing instructions executable by a processor to:
receive a definition of functional roles to be played by resource instances within a multi-resource computing system;
receive, for a first functional role of the functional roles, an identification of a group of resource instances for carrying out the first functional role;
select, for the first functional role of the functional roles, a designated exemplar from the group of resource instances;
capture a first plurality of characteristics of the designated exemplar;
assign the captured first plurality of characteristics to a first functional role template for the first functional role;
specify a first characteristic of the first functional role template as a triggering characteristic;
specify a predefined change amount for the triggering characteristic;
during operation of the multi-resource computing system, measure configuration drift by comparing resource instances for the first functional role to the first functional role template; and
in response to a detection of the predefined change amount in the triggering characteristic:
select a second designated exemplar from the group of resource instances, the second designated exemplar different from the designated exemplar;
capture a second plurality of characteristics of the second designated exemplar;
automatically generate a second functional role template for the first functional role using the second plurality of characteristics.

16. The storage medium of claim 15, where the predefined change amount for the triggering characteristic is associated with an improved efficiency for the first functional role.

17. The storage medium of claim 15, where the predefined change amount for the triggering characteristic is associated with a reduced equipment expense for the first functional role.

18. The storage medium of claim 15, where the predefined change amount for the triggering characteristic is associated with an improved maintenance for the first functional role.

19. The storage medium of claim 15, where the predefined change amount for the triggering characteristic is indicative of file corruption in a database file structure.

20. The storage medium of claim 15, where to select the designated exemplar, the instructions are executable to select multiple resource instances from the group of resource instances so that a multiple-instance grouping serves as the designated exemplar.

* * * * *